US009360033B2

(12) United States Patent
Gromes et al.

(10) Patent No.: US 9,360,033 B2
(45) Date of Patent: Jun. 7, 2016

(54) DEVICE FOR DETACHABLE FASTENING OF AN ASSEMBLY PART

(71) Applicant: Anvis Deutschland GmbH, Steinau an der Strasse (DE)

(72) Inventors: Martin Gromes, Steinau an der Strasse (DE); Sabine Protzmann, Steinau an der Strasse (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 122 days.

(21) Appl. No.: 14/213,916

(22) Filed: Mar. 14, 2014

(65) Prior Publication Data
US 2014/0259564 A1　Sep. 18, 2014

(30) Foreign Application Priority Data
Mar. 15, 2013　(DE) .......................... 10 2013 004 515

(51) Int. Cl.
*F16B 5/12*　(2006.01)
(52) U.S. Cl.
CPC ... *F16B 5/12* (2013.01); *Y10T 24/42* (2015.01)
(58) Field of Classification Search
CPC .............. F16B 5/12; F16B 5/06; Y10T 24/42
USPC ................. 411/41, 45–51, 53, 508–510, 913; 24/453, 297, 606, 607
See application file for complete search history.

(56) References Cited
U.S. PATENT DOCUMENTS

| | | | | |
|---|---|---|---|---|
| 4,276,806 A | * | 7/1981 | Morel .............................. | 411/41 |
| 5,261,772 A | * | 11/1993 | Henninger et al. ............. | 411/46 |
| 5,775,860 A | * | 7/1998 | Meyer .............................. | 411/46 |
| 6,874,983 B2 | * | 4/2005 | Moerke et al. .................. | 411/46 |
| 6,910,840 B2 | * | 6/2005 | Anscher .......................... | 411/45 |
| 6,932,552 B2 | * | 8/2005 | Anscher et al. ................. | 411/45 |
| 7,207,759 B2 | | 4/2007 | Kato | |
| 7,740,432 B2 | * | 6/2010 | Harada ........................... | 411/45 |
| 7,841,817 B2 | * | 11/2010 | Kawai ............................. | 411/45 |
| 7,862,273 B2 | * | 1/2011 | Ooyama et al. ................ | 411/45 |
| 7,954,206 B2 | * | 6/2011 | Scroggie et al. ............. | 411/509 |
| 7,976,056 B2 | * | 7/2011 | Kirchen et al. ................ | 411/45 |
| 8,043,038 B2 | * | 10/2011 | Sano .............................. | 411/45 |
| 2001/0022923 A1 | * | 9/2001 | Arisaka .......................... | 411/45 |

(Continued)

FOREIGN PATENT DOCUMENTS

| | | |
|---|---|---|
| DE | 10 2005 062 979 | 7/2006 |
| DE | 10 2007 016 484 | 10/2008 |
| WO | 2009030334 | 3/2009 |

*Primary Examiner* — Gay Ann Spahn
(74) *Attorney, Agent, or Firm* — Quarles & Brady LLP

(57) ABSTRACT

A device for detachable fastening of an assembly part on a receptacle, the device including a base having a contact flange, at least one clamping arm formed on the contact flange, which snaps resiliently into a clamping position in a radial latching direction. An axial insertion opening is formed in the contact flange. A mandrel is removably inserted into the insertion opening. The mandrel extends as far as a blocking actuation section in a blocking position accommodated in the insertion opening to limit a displacement of the clamping arm from the clamping position or widen the clamping arm in the latching direction into the clamping position. The clamping arm includes an actuation release section which can be actuated by an actuating pin inserted via the insertion opening to urge the clamping arm resiliently from the clamping position opposite to the latching direction.

16 Claims, 3 Drawing Sheets

(56) References Cited

U.S. PATENT DOCUMENTS

| | | | |
|---|---|---|---|
| 2003/0194288 A1* | 10/2003 | Moerke et al. | 411/46 |
| 2004/0247410 A1* | 12/2004 | Anscher et al. | 411/45 |
| 2004/0253074 A1* | 12/2004 | Anscher | 411/45 |
| 2005/0002759 A1* | 1/2005 | Pares Isanta | 411/501 |
| 2005/0123379 A1* | 6/2005 | Barina et al. | 411/508 |
| 2007/0189875 A1* | 8/2007 | Ooyama et al. | 411/45 |
| 2008/0014045 A1* | 1/2008 | Kawai | 411/45 |
| 2008/0199272 A1* | 8/2008 | Limpert et al. | 411/46 |
| 2008/0240882 A1* | 10/2008 | Schwarzkopf | 411/46 |
| 2008/0279650 A1* | 11/2008 | Hauser | 411/45 |
| 2009/0000085 A1* | 1/2009 | Okada et al. | 24/453 |
| 2010/0072735 A1* | 3/2010 | Kirchen et al. | 411/45 |
| 2010/0158632 A1* | 6/2010 | Sano | 411/22 |
| 2010/0172714 A1* | 7/2010 | Sano | 411/48 |
| 2013/0136559 A1* | 5/2013 | Hauser | 411/45 |
| 2013/0257025 A1* | 10/2013 | Yamamoto | 411/356 |
| 2014/0047679 A1* | 2/2014 | Lepper et al. | 24/453 |

* cited by examiner

DEVICE FOR DETACHABLE FASTENING OF AN ASSEMBLY PART

CROSS REFERENCE TO RELATED APPLICATION

The present application claims the benefit of German Patent Application No. DE 10 2013 004 515.0 filed Mar. 15, 2013, which is fully incorporated herein by reference.

BACKGROUND

The subject matter disclosed herein relates to a detachable fastening device such as an expansion clip or insertion expansion clip. The detachable fastening device is intended to hold an assembly part such as a motor vehicle part, preferably a motor vehicle part exposed to vibrations, such as an absorption mass, firmly and immovably in a receptacle holding the assembly part, in particular a vehicle autobody. A motor vehicle radiator can be considered to be an assembly part whose fastening devices must withstand high vibrational loads. Usually the autobody-side fastening of the assembly part is made by means of screwing into a threaded bore on the motor vehicle body. However, it has been shown that the screw connection cannot provide a sufficient play-free fatigue endurance limit. The motor vehicle industry uses the so-called "shaker test" to examine the stability of the autobody-side connection of the assembly part, in which accelerating load forces of up to 5 g act on the assembly part. In motor vehicle radiators of the usual size, maximum loads of 150 kg should be withstood over a fairly long period.

An example for a generic detachable fastening device is known from German Patent Reference DE 10 2007 016 484 A1 which discloses an insertion expansion clip. The expansion clip comprises a base or a sleeve-like body part having a contact flange, three clamping arms formed on the contact flange which are initially expanded resiliently in the radial direction in an inward deforming manner for locking into a clamping position before then snapping outwards resiliently in the radial direction. In order to achieve the locking, the clamping arms snap in an expanding or spreading manner into the receptacle of the motor vehicle autobody, wherein the assembly part to be fastened is locked between the contact flange of the base of the expansion clip and the motor vehicle autobody. An axial insertion opening is formed in the contact flange into which a blocking or expanding mandrel is inserted when the expansion clip is disposed in the clamping position. The three clamping arms each have a blocking or expanding actuation section. The blocking or expanding mandrel received in the insertion opening extends in the axial direction as far as the blocking or expanding actuation section and comes into contact engagement therewith, which is why the blocking or expanding mandrel prevents an expanding or spreading deformation of the clamping arms from their clamping position radially inwards or even widens the clamping arms in an expanding or spreading manner further into the clamping position in the radial latching direction. The detachable fastening device ensures by means of the blocking or expanding mandrel that the clamping arms do not open autonomously when loads act on the assembly part or the vehicle body and an unintentional release of the assembly part from the motor vehicle body is avoided.

The release of the fastening device is enabled by access to the clamping arms from outside. As a result of the limited installation space, in particular in the engine compartment, in particular in the case of blind hole receptacles, the accessibility required for release is not readily ensured so that the usability of the known expansion clip is limited.

It is one object of the invention to overcome the disadvantages of the prior art, in particular to provide a generic detachable fastening device for an assembly part such as a motor vehicle part which enables a simple release of the fastening device itself even if there is no possibility for access from the outside to the detachable fastening device.

SUMMARY

Accordingly, a detachable fastening device, in particular an expansion clip such as the insertion expansion clip described above is provided by which means an assembly part such as a motor vehicle part, in particular a motor vehicle part exposed to vibrations such as an absorption mass or a motor vehicle radiator, is to be clamped firmly and immovably, free from play, on a receptacle holding the assembly part, in particular a vehicle autobody. For the firm mounting of the assembly part on the receptacle, the assembly part is placed on the receptacle. The fastening device is inserted, for example, into a bore in the assembly part and into a substantially congruent recess in the receptacle, the fastening device delivering fastening forces in order to clamp the assembly against the receptacle. The insertion expansion clip of which in one embodiment all the components are fabricated from a hard-elastic plastic, comprises a base having a contact flange which is implemented, for example, substantially as a plate and which has a substantially flat or smooth contact surface facing the assembly part. In one embodiment, at least one clamping or expanding arm is formed on or integrally with the contact flange, where two clamping arms or precisely one pair of clamping arms can be provided. The at least one clamping arm is configured to engage or snap into a clamping position in the radial direction for locking after overcoming a radial elastic pre-deformation. In order in particular to make the elastic snapping or engagement haptically perceptible, the clamping arm and the contact flanges are made of one piece wherein the snapping elasticity is achieved at a pivot or hinge joint formed in one piece by means of a cross-section reduction at the transition between the contact flange and the at least one clamping arm. In one embodiment, an axial insertion opening is formed substantially centrally or in the middle of the contact flange, from the edge boundary of which the at least one clamping arm extends in the axial direction away from the base. Furthermore, the fastening device according to one embodiment comprises a blocking or expanding mandrel for removable insertion into the insertion opening and permanent stationary or fixed occupation of the insertion opening. For this purpose preferably the insertion and the blocking or expanding mandrel are adapted in shape or matched in shape to one another in such a manner that the blocking or expanding mandrel can be inserted into the insertion opening with play. The at least one clamping arm comprises a blocking or expanding actuation section which is in contact engagement with the blocking or expanding mandrel for fixing the at least one clamping arm in the radial latching direction in its clamping position or for additional radial spread-widening of the at least one clamping arm in its clamping position. It shall be clear that the blocking or expanding mandrel in its blocking position, i.e. when determining the at least one clamping arm in the radial deformation direction, need not necessarily contact the blocking or expanding actuation section of the at least one clamping arm. There can be a gap between the blocking and expanding actuation section and the blocking or expanding mandrel, but the blocking or expanding mandrel in its blocking position should at least prevent the at least one clamping arm from being unlocked from its clamping position with the body receptacle. The blocking or expanding mandrel is dimensioned in such a manner that it extends at least as far as the blocking or expanding actuation section of the at least one clamping arm in the blocking or expanding position accommodated in the insertion opening, in order to at least block the displacement of the at least one clamping arm from the clamping position or widen the at least one clamping arm further in the radial direction. In one embodiment, the at least one clamping arm, in particular its film hinge joint, is relaxed in its clamping position or is urged further radially into the clamping position in an elastic deforming manner via a changeover position in the latching direction through the insertion of the blocking or expanding mandrel. According to one embodiment, the at least one clamping arm additionally has an actuation release section which is to be actuated by an actuating pin inserted via the insertion opening in such a manner that the at least one clamping arm is urged resiliently by the actuating pin from the clamping position opposite to or contrary to the latching direction, i.e. contrary to the latching direction of the elastic pre-assembly deformation, in an unlocking manner. The actuating pin inserted in the insertion opening therefore brings about, through the engagement with the actuation release section of the at least one clamping arm, its resilient displacement from the clamping position fixing the fastening device, whereby the fastening device can simply be freed from the assembly part and the receptacle.

The actuating pin can be implemented by the blocking or expanding mandrel having a combined function which, starting from a release position accommodated in the insertion opening additional to the blocking or expanding position, in which in particular the blocking or expanding mandrel is specifically not in engagement with that of the blocking or expanding actuation section, releases the at least one clamping arm by displacing same resiliently opposite to the radial latching direction. Alternatively the actuation release section can be actuated, when the blocking or expanding mandrel is removed from the insertion opening, by a tool such as a slotted screwdriver. With the measure according to one embodiment, it is then possible to release the fastening device non-destructively even when access to the clamping arms from outside is impossible. The fastening device can be released via the additional actuation release section which can be manipulated via the axial insertion opening. The shape of the insertion opening and the shape of the actuation release section are constructively structurally adapted or matched to one another in such a manner that for actuation of the inserted actuating pin, an axial displacement of the actuating pin and/or a rotation of the actuating pin about its longitudinal axis is allowed.

In one embodiment of the invention, the actuation release section is formed on the end of the at least one clamping arm opposite the base. The actuation release section can form the unactuated free end of the clamping arm. The blocking or expanding actuation section is formed between the free end and a base-side pivot joint of the at least one clamping arm.

If the blocking or expanding mandrel is also to form the actuating pin, a simultaneous engagement with the actuation release section and the blocking or expanding actuation section is eliminated. Either the blocking or expanding actuation section is occupied by the blocking or expanding mandrel in order to prevent an undesired unlocking of the at least one clamping arm opposite or contrary to the latching direction, or the actuation release section can be brought into engagement with the blocking or expanding mandrel in order to achieve the unlocking opposite or contrary to the latching direction. In the embodiment of the blocking or expanding mandrel as an actuating pin, the blocking or expanding mandrel has a correspondingly shaped engagement end which, in the release position provided for release, within the insertion opening projects axially and radially beyond the actuation release section of the clamping arm, wherein the release of the clamping arm is brought about by a withdrawal movement of the blocking or expanding mandrel from the insertion opening. The engagement end of the blocking or expanding mandrel can, for example, be formed by a barbed hook structure which can be brought into engagement with a corresponding shaped hook structure of the actuation release section of the clamping arm. In order to change between the blocking or expanding position and the release position of the blocking or expanding mandrel, this can be turned by a certain angle, preferably 90°, about its longitudinal axis so that in one angular position the blocking or expanding actuation section is actuated and in another angular position, the engagement end of the blocking or expanding mandrel functionally enters into engagement with the actuation release section of the clamping arm.

In a further development, the actuation release section and in particular the blocking or expanding actuation section are each to be considered to be part of an expander gear. The expander gear serves to convert a substantially axial insertion movement of the actuating pin relative to at least one clamping arm into a substantially radial expansion or spreading, in particular into an expanding or spreading pivoting movement of the at least one clamping arm. The expander gear is consequently formed by sections of the clamping arm and in cooperation with the actuating pin, which in the case of a combined function with the blocking or expanding mandrel, can be part of the fastening device according to one embodiment. In one embodiment, the conversion of movement always takes place when the actuating pin will be or is inserted axially into the insertion opening. In one embodiment, the actuation release section is part of a release expander gear for a radial inward expanding of the at least one clamping arm, wherein the blocking or expanding or spreading-out actuation section is part of a locking expander gear for a radial expanding of the at least one clamping arm. In one embodiment, the expanding or spreading-out is opposite to the inward expanding in a radial direction. During the insertion movement of the expanding mandrel, its insertion movement is converted into an expanding pivoting outwards movement of the at least one clamping arm. During the insertion movement of the actuating pin about its longitudinal axis, the release expander gear is activated in order to convert the axial displacement of the actuating pin into a radial inward expanding of the at least one clamping arm for its unlocking.

In one embodiment, the at least one clamping arm confines an insertion channel for the axial guidance of the actuating pin towards the actuation release section.

In a further development, the expander gears comprise a common insertion channel confined at least by the at least one clamping arm for the axial guidance of the actuating pin towards the actuation release section and the blocking or expanding actuation section. The actuation release section as well as the blocking or expanding actuation section in particular point towards the insertion channel in such a manner that an engagement release surface of the actuating pin for cooperating with the actuation release section and an engagement locking surface of the actuating pin for cooperating with the blocking or expanding actuation section are substantially facing away from one another, in particular form sides of the actuating pin facing away from one another. The respective engaging surfaces of the blocking or expanding actuation section and the expanding actuation section are not operationally occupied simultaneously. The respective occupation excludes the other.

In one embodiment, in order to provide an expanding release gear, the at least one clamping arm, in particular the actuation release section of the at least one clamping arm, has an expanding direction changer which, upon actuation by the actuating pin, in particular upon axial insertion of the actuating pin along the insertion channel, during insertion or upon a partial rotation of the actuating pin about its longitudinal axis, pivots the at least one clamping arm towards the actuating pin in order to thereby free the at least one clamping arm from its engaged clamping position. The expanding direction changer serves to reverse the expanding expected by insertion of the actuating pin into a diametrically opposite, radially inwardly directed inward expanding although the blocking or expanding mandrel during the same insertion movement (but in a (certain) twist position relative to the clamping arm) causes an expanding of the clamping arm outwards or at least adopts a blocking position.

In a further development, the actuation release section has a release engaging surface. The blocking or expanding actuation section also has a blocking or expanding engaging surface. Both surfaces can be flat or curved and, in one embodiment, lie parallel to one another. The release engaging surface and the blocking or expanding engaging surface face one another but do not overlap in the axial direction but are offset with respect to one another in the axial direction. The allocation of the release engaging surface and the blocking or expanding engaging surface towards one another can be achieved, for example, wherein in particular at the end of the at least one clamping arm opposite the base, a radial bridge is provided for radially offsetting of the actuation release section with respect to the blocking and expanding engaging surface. The radial bridge achieves the change of expanding direction as a result of the radial offset of the release engaging surface thereby achieved. The radial bridge crosses the insertion channel so that both the release engaging surface as well as the blocking or expanding engaging surface are facing the insertion channel and ultimately radially confine the insertion channel.

In one embodiment, the actuation release section and in particular the blocking or expanding actuation section are each assigned a stationary counter section with respect to the base of the fastening device supported for the expanding in such a manner that when the insertion opening is occupied, the actuating pin is supported on the actuation release section or in particular the blocking or expanding actuation section and on the respective associated counter section in order to displace the at least one clamping arm according to operation contrary to the latching direction resiliently from the clamping position in an unlocking manner or to block contrary to the latching direction or widen in the latching direction. In one embodiment, the respective firm-base counter section is part of another clamping arm.

In a further development, the base comprises at least two opposed clamping arms, in particular precisely two opposed clamping arms opposite one another. The clamping arms comprise diametrically opposed, radial latching directions. The two clamping arms each have facing surfaces of the blocking or expanding actuation sections and facing surfaces of the actuation release sections. The respective engaging surfaces can be disposed in such a manner that the engaging surface of one blocking or expanding actuation section of the first clamping arm is allocated or assigned to the release surface of the actuation release section of the second clamping arm and vice versa. For displacing, blocking and/or widening of one of the clamping arms opposite to the latching direction and/or in the latching direction, the actuating pin is supported on the respective blocking or expanding engaging surface or on the release engaging surface of the other clamping arm.

In one embodiment, the actuating pin has a head for abutting against the contact flange and a plug-in or insertion shaft, wherein a counter-actuation release section is formed at the end of the insertion shaft and a counter-blocking or expanding actuation section is formed between the end and the head.

In one embodiment, the counter-actuation release section is achieved by an in particular slotted-screw-shaped tapering formed in the lateral direction. In an alternative embodiment, the counter-actuation release section for each clamping arm is provided with a conical undercut which is adapted in shape to an inclined outer surface of the actuation release section. The inclined outer surface of the release section can lie radially externally outside. Upon engagement of the counter-actuation release section with the actuation release section, the conical undercut moves the outer surface in accordance with axial displacement, in particular withdrawal, of the actuating pin from the insertion opening the at least one clamping arm for unlocking radially inwards, in order to unlock the clamping arm from its clamping position.

In one embodiment, the blocking or expanding mandrel comprises a loss prevention device which in particular is positioned between a head for abutting against the contact flange and an insertion end of the blocking or expanding mandrel.

In a further development, the blocking or expanding mandrel has a fastening detent by which means the blocking or expanding mandrel in a contact position on the contact flange is fastened immovably in a certain twist position on the base.

In one embodiment, an arrangement comprises the detachable fastening device according to various embodiments as well as an actuating pin, which, in one embodiment, has a slotted-screwdriver-shaped end.

BRIEF DESCRIPTION OF THE DRAWINGS

Further properties, advantages and features of various embodiments will become clear from the following description of exemplary embodiments by means of the appended drawings in which.

DETAILED DESCRIPTION

Figure 1:
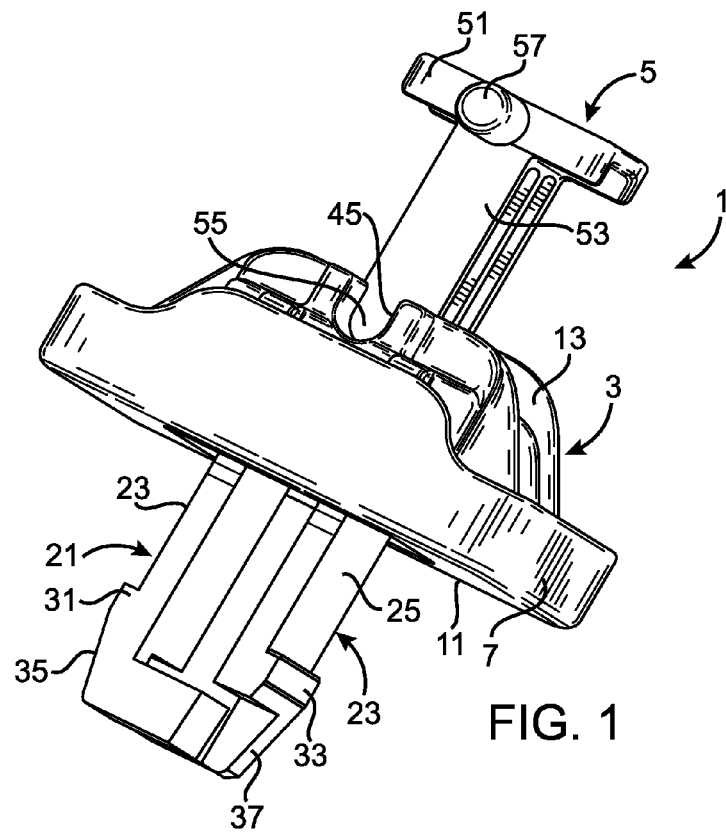
FIG. 1 shows a perspective side view of an unsecured exemplary insertion expansion clip in which a blocking mandrel is located in a partially inserted pre-assembly state.
Figure 2:
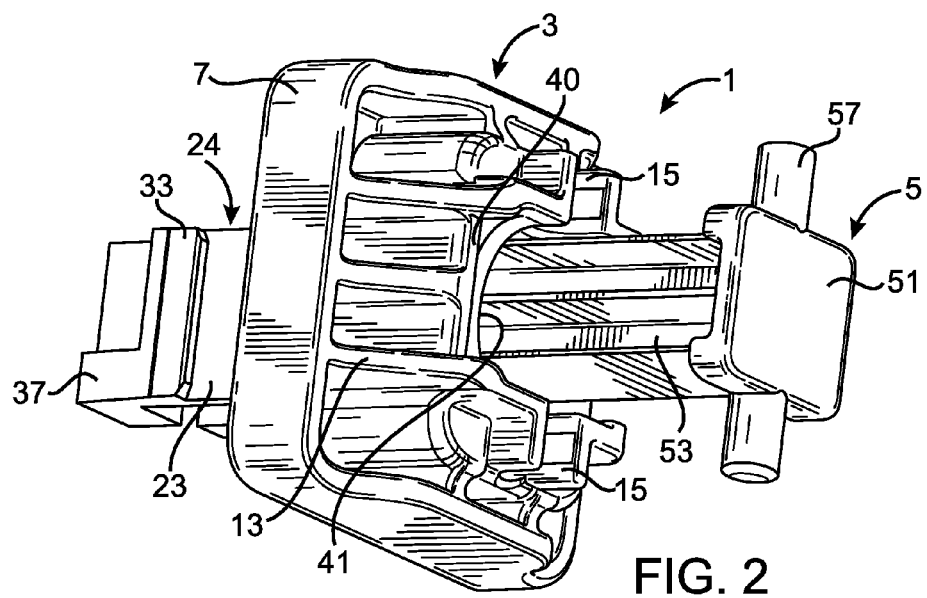
FIG. 2 shows another side view of the insertion expansion clip according to FIG. 1.

In FIGS. 1 to 6 the device according to one embodiment for detachable fastening of an assembly part to a receptacle 12 of a vehicle autobody which holds the assembly part (not shown) is generally designated by the reference number 1.

Subsequently the fastening device 1 is designated as (insertion) expansion clip 1. The expansion clip 1 has two separate main components which are movable with respect to one another i.e. a base 3 and a blocking mandrel 5 which are formed separately from one another from a hard-elastic plastic, in a particular embodiment injection-molded.

In one embodiment, the base 3 has a substantially square plate with round ends and a contact flange 7 having an even or flat contact surface 11 which is to be placed on the assembly part to be mounted (not shown). On the side of the contact flange 7 opposite the contact surface 11, which faces the autobody receptacle 12 of the vehicle, a plurality of stiffening ribs 13 are formed as well as a snap receptacle 15. From this side of the contact flange 7 on the autobody side, two substantially mirror-symmetrically shaped clamping arms 21, 23 extend in the axial direction A, which on the outer sides 25, 27 thereof each have a locking hook 31, 33 which resiliently engages in a recess 39 on the vehicle autobody side. The recess 39 is dimensioned for the latching accordingly with an axial distance from the contact end of the receptacle 12. In order to produce the resilient latching forces of the clamping arms 21, 23, the respective clamping arm 21, 23 each has a pivot joint 40 which allows a defined pivoting or spreading movement of the locking hooks 31, 33 in the radial direction R about a pivot axis P. The two pivot joints which are achieved by corresponding cross-sectional reductions of the clamping arms 21, 23 are pre-tensioned during mounting by expanding or spreading of the clamping arms 21, 23 radially inwards as a result of resilient deformation in order to allow the latching movement in the radial latching direction R. For a controlled build-up of the assembly pre-tension in the pivot joint 40, each latching or locking hook 31, 33 has an inclined approach surface 35, 37 with respect to the axial direction A which runs down the body receptacle 12.

Figure 6:
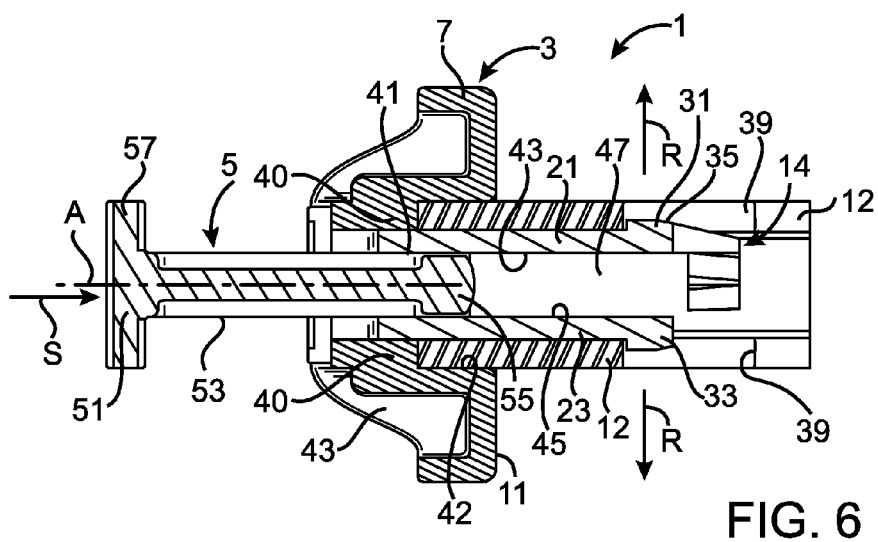
FIG. 6 shows a cross-sectional view of the mounted but still unsecured insertion expansion clip along the line of intersection VI-VI according to FIG. 5.

As is apparent in particular in FIG. 6, the clamping arms 21, 23 are realized in one piece with the contact flange 7 and form the one-piece pivot joint 40 at the transition.

The contact flange 7 has a central insertion opening 41 whose boundary edge is substantially square. At a certain radial distance from a boundary edge of a passage 42 of the insertion opening 41 formed in the contact flange 7, the two clamping arms 21, 23 extend past towards the assembly part not shown.

The two clamping arms 21, 23 each have parallel inner sides 43, 45 on each of which a blocking actuation section is formed. In this embodiment, the blocking actuation section is positioned at the axial height of the latching hooks 31, 33 of the clamping arms 21, 23.

Figure 3:
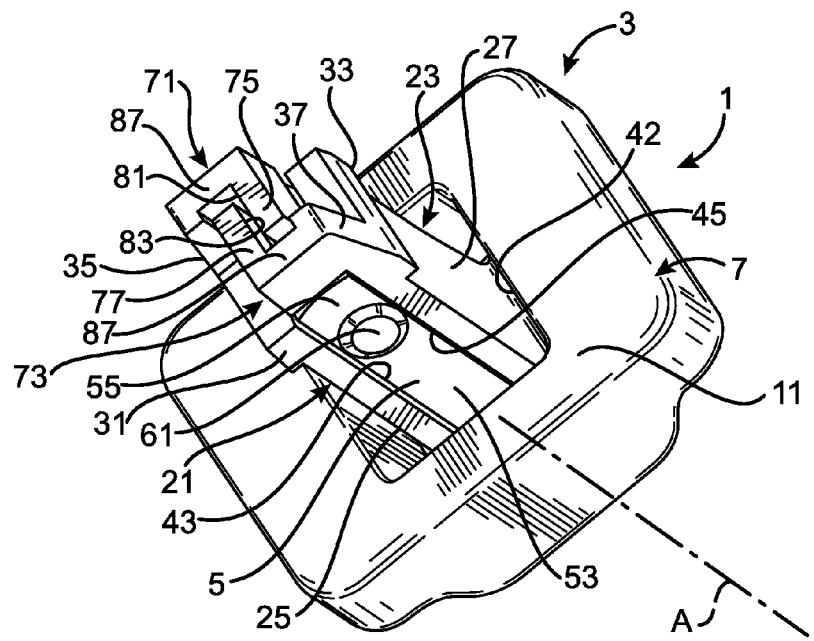
FIG. 3 shows an autobody-side perspective rear view of the secured insertion expansion clip according to FIGS. 1 and 2, wherein the blocking mandrel is completely inserted in the blocking position.
Figure 4:
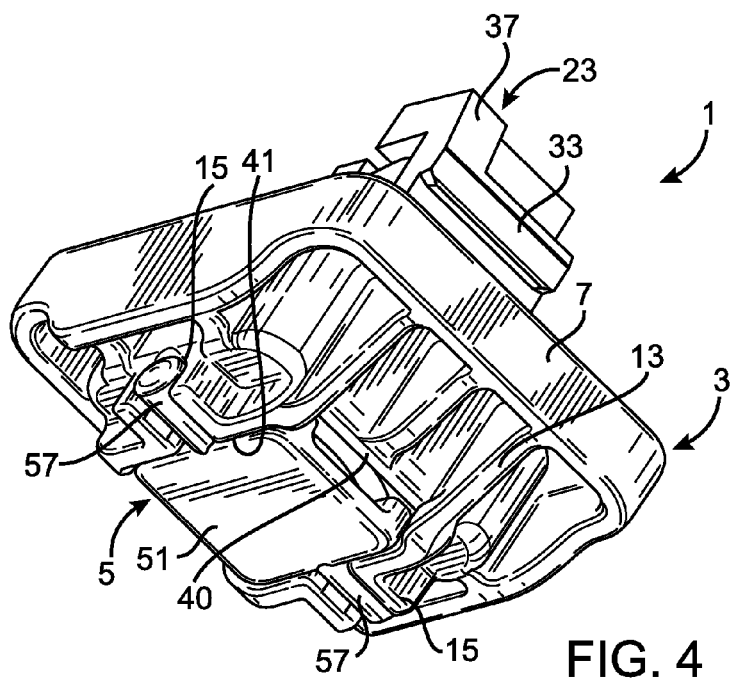
FIG. 4 shows a perspective front view of the insertion expansion clip on the assembly part side according to FIG. 3.
Figure 5:
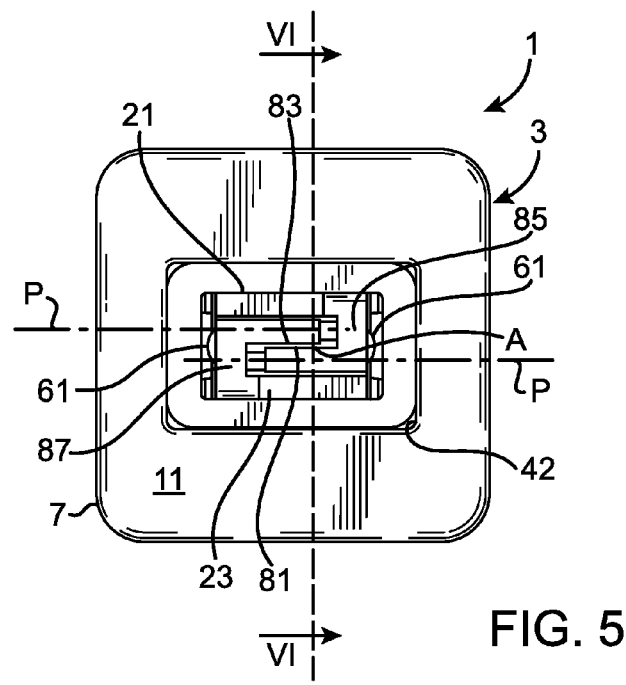
FIG. 5 shows an autobody-side end view of the insertion expansion clip according to FIGS. 1 to 4.

The opposite, substantially parallel inner surfaces 43, 45 of the clamping arms 21, 23 define, starting from the insertion opening, an insertion channel 47 which is fully occupied by the blocking mandrel 5 in FIGS. 3 and 4. Along the insertion channel 47 the blocking mandrel 5 is guided in the axial direction from the pre-assembly position shown in FIG. 6 into the blocking position indicated in FIGS. 3 and 4.

The blocking mandrel 5 comprises a plate-shaped head 51 which is adjoined in one piece by a shaft 53. The shaft 53 forms a counter-blocking actuation section 55 which is dimensioned in such a manner that in the inserted state of the blocking mandrel 5 (FIGS. 3, 4), it blocks the clamping arms 21, 23 in the clamping position thereof so that an (unlocking) inward expanding or spreading of the clamping arms 21, 23 in the radial direction inwards contrary to the latching direction R is prevented. In this blocking position, snap lugs 57 which are formed integrally with or on the head 51 of the blocking mandrel 5 engage firmly in the snap receptacle 15 of the base 3 in order to secure the blocking mandrel 5 in its blocking position. In this final assembly state (FIGS. 3, 4), a secure fastening of the assembly part on the vehicle autobody 12 is ensured even under maximum vibrational loads because an undesired release and migration of the clamping arms 21, 23 from the recess 39 is prevented.

Furthermore, on its short longitudinal side the blocking mandrel 5 has a pair of opposed loss prevention protuberances 61 which prevent the loosely displaceably inserted blocking mandrel 5 from falling out from the insertion channel 47 and the insertion opening 41 contrary to the insertion direction S. Here the dimension of the insertion opening 41 is adapted to the radial spacing of the loss prevention protuberances 61. With appropriate expenditure of force the blocking mandrel 5 can still be completely removed from the insertion channel 47 and also inserted back again.

In order to lock the clamping arms 21, 23 even more strongly in the clamping position shown (FIGS. 3 and 4), the counter blocking actuation section 55 can be dimensioned larger in the radial direction R than the insertion channel 47 at the axial height of the latching hooks 31, 33. In this way these latching hooks (31, 33) are widened radially outwards during insertion of the blocking mandrel 5 and are pressed even more strongly into the clamping position. In this embodiment the blocking mandrel 5 would be executed as an expanding mandrel. In this embodiment a gear reduced or stepped down radial movement of the clamping arms in the latching direction R is achieved through the insertion of the expanding mandrel in the axial and insertion direction S. Conversion of the movement from an axial insertion movement of large movement amplitude into a radial pivoting movement of small pivoting scope for the latching hooks 31, 33 is achieved by a latching expansion gear.

In order to release the clamping arms 21, 23 from the recess 39 without damaging the expansion clip 1, both clamping arms 21, 23 form the part of an (additional) release expansion gear which converts the axial movement of an actuating pin not shown in detail in the embodiment shown, but which possibly may also be the blocking mandrel 5, in the insertion direction S into a movement of the clamping arms 21, 23 from their clamping position in the radial direction inwards. With the same direction of actuation S, the release expansion gear acts in the opposite latching direction R.

The release expansion gear comprises at each free end of the clamping arms 21, 23 one expanding direction changer 71, 73 which achieves the inward expanding during movement of the actuating pin in the insertion direction S. The respective expanding or spreading direction changer 71, 73 has an actuation release section 75, 77. Both actuation release sections 75, 77 have release surfaces 81, 83 facing each other. The change of direction with the same insertion direction S of the, not shown, actuating pin such as a slotted screwdriver is achieved by means of a radial bridge 85, 87 which radially offsets the release surfaces 81, 83 with respect to the blocking actuation section (inner sides 43, 45) of the clamping arm 21, 23, wherein an axial overlap of the release surfaces 81, 83 with respect to surfaces of the blocking actuation section is excluded with the radial offset. The release surfaces 81, 83 face the inner side 43, 45 of the clamping arm forming the respective blocking actuation section, wherein the insertion channel 47 is confined or defined therebetween. If the slotted-screwdriver is now inserted in the insertion channel 47 freed from the blocking mandrel 5, the end of the screwdriver brought between the engaging surfaces 81, 83 and possibly turned or displaced further axially, the two actuation release sections 75, 77 are removed from one another in the radial direction R, wherein the ends of the clamping arms 21, 23 and thereby the latching hooks 31, 33 are urged towards one another into the insertion channel 47, whereby the clamping arms release the recess 39.

With the expanding direction changer 71, 73 it is possible to achieve a simple non-destructive release of the clamping arms 21, 23 from the recess 39 via the insertion opening 41 and the insertion channel 47 without requiring an external access to the latching hooks 31, 33 on the autobody receptacle side.

The features disclosed in the preceding description, the figures and the claims can be of importance for the implementation of the invention in the various embodiments both individually and in any combination.

The invention claimed is:

1. A device for detachable fastening of an assembly part on a receptacle (39) holding the assembly part, the device comprising:
    a base (3) having a contact flange (7), at least one clamping arm (21, 23) formed on the contact flange (7), which snaps resiliently into a clamping position in a radial latching direction, and an axial insertion opening (41) formed in the contact flange (7); and
    a mandrel (5) for removable insertion into the insertion opening (41), the at least one clamping arm (21, 23) comprising a blocking actuation section and the mandrel (5) extending as far as the blocking actuation section in a blocking position accommodated in the insertion opening (41), in order to block a displacement of the at least one clamping arm (21, 23) from the clamping position or widen the at least one clamping arm (21, 23) in the latching direction into the clamping position,
    wherein the at least one clamping arm (21, 23) further comprises an actuation release section which can be actuated by an actuating pin inserted via the insertion opening (41) such that the at least one clamping arm (21, 23) is urged resiliently from the clamping position opposite to the latching direction.

2. The device according to claim 1, wherein the actuation release section is formed on an end of the at least one clamping arm (21, 23) opposite the base (3).

3. The device according to claim 1, further comprising an expander gear including the blocking actuation section and the actuation release section, the expander gear adapted to convert a substantially axial insertion movement of the actuating pin into a radial expanding pivoting movement of the at least one clamping arm (21, 23).

4. The device according to claim 1, wherein the at least one clamping arm (21, 23) defines an insertion channel (47) for the axial guidance of the actuating pin towards the actuation release section (75, 77).

5. The device according to claim 4, wherein the actuation release section (75, 77) has an expanding direction changer (71, 73) which, upon insertion of the actuating pin into the insertion channel (47), moves the at least one clamping arm (21, 23) towards the actuating pin.

6. The device according to claim 1, wherein the actuation release section (75, 77) has a release engaging surface and the blocking actuation section has a blocking engaging surface, and the release engaging surface faces the blocking engaging surface.

7. The device according to claim 1, wherein the actuation release section (75, 77) faces a counter section of the at least one clamping arm, such that when the insertion opening (41) is occupied, the actuating pin is supported on the actuation release section (75, 77) and on the counter section.

8. The device according to claim 1, wherein the at least one clamping arm (21, 23) comprises two opposed clamping arms (21, 23) formed on the base (3), each of the two opposed clamping arms (21, 23) comprising a facing surface of the blocking actuation section and a facing surface of the actuation release section (75, 77), wherein the actuating pin is supported on a respective blocking engaging surface or on a release engaging surface of the other clamping arm for urging the two opposed clamping arms (21, 23) in a direction opposite to the latching direction or in the latching direction.

9. The device according to claim 1, wherein the actuating pin comprises a head (51) for abutting against the contact flange (7) and an insertion shaft (53), wherein a counter-actuation release section is formed at an end of the insertion shaft (53) and a counter-blocking actuation section (55) is formed between the end and the head (51).

10. An arrangement comprising a detachable fastening device according to claim 1 and an actuating pin which can be inserted in the insertion opening (41).

11. The device according to claim 1, wherein the actuating pin comprises one of the mandrel (5) and a tool.

12. The device according to claim 2, wherein the blocking actuation section is formed between the end of the at least one clamping arm (21, 23) and a pivot joint of the at least one clamping arm (21, 23).

13. The device according to claim 1, further comprising:
    a release expander gear including the actuation release section adapted to urge the at least one clamping arm (21, 23) radially inward; and
    a locking expander gear including the blocking actuation section adapted to urge the at least one clamping arm (21, 23) radially outward.

14. The device according to claim 4, wherein the actuation release section (75, 77) has an expanding direction changer (71, 73) which, upon a partial rotation of the actuating pin about its longitudinal axis, moves the at least one clamping arm (21, 23) towards the actuating pin.

15. The device according to claim 1, wherein the blocking actuation section faces a counter section of the at least one clamping arm, such that when the insertion opening (41) is occupied, the actuating pin is supported on the blocking actuation section (75, 77) and on the counter section.

16. The device according to claim 9, wherein the counter-actuation release section for each of the at least one clamping arm (21, 23) has a conical undercut adapted in shape to an inclined outer surface of the actuation release section (75, 77) such that, on engagement of the counter-actuation release section with the actuation release section (75, 77), the conical undercut occupies an outer surface and, during axial displacement of the actuating pin from the insertion opening (41), the at least one clamping arm (21, 23) is pivoted radially inwards.

* * * * *